Aug. 15, 1967  C. E. DALE  3,336,051
TRAILER COUPLER
Filed Oct. 11, 1965
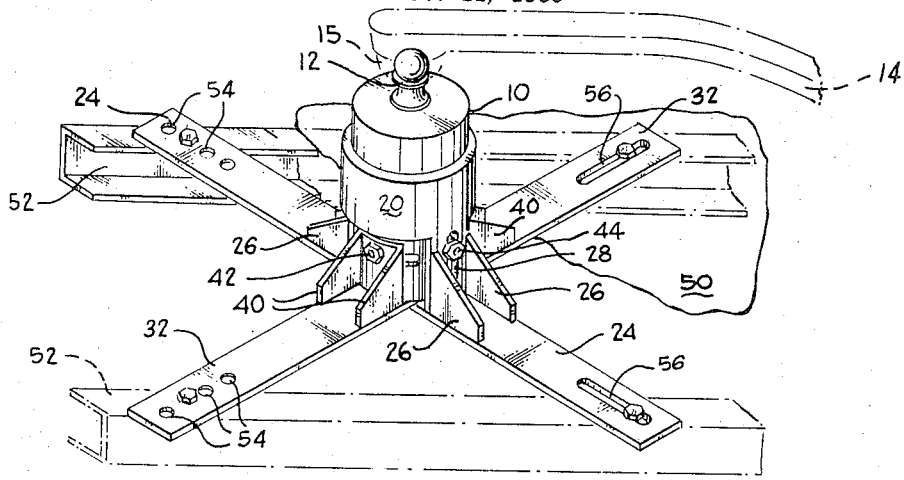
*Fig. 1.*
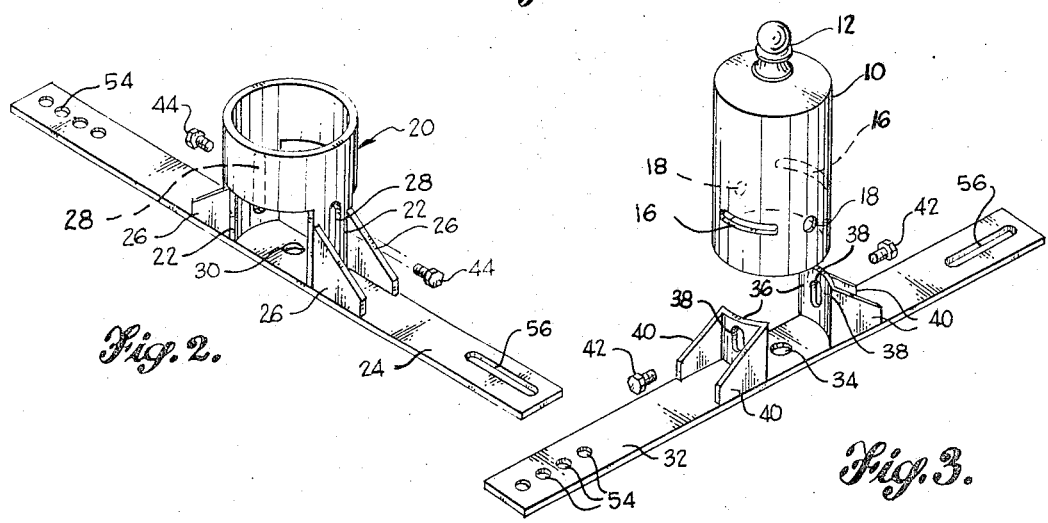
*Fig. 2.*  *Fig. 3.*
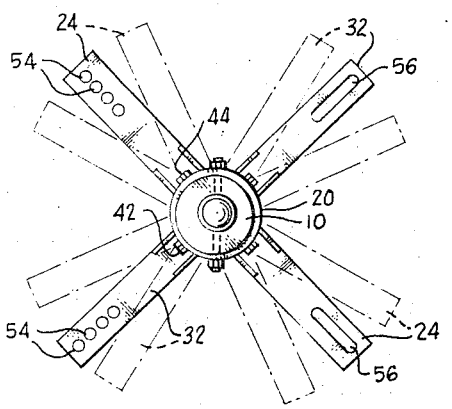
*Fig. 4.*
INVENTOR.
CHARLEY E. DALE
BY
ATTORNEY

3,336,051
TRAILER COUPLER

Charley E. Dale, Seattle, Wash., assignor to The Dale-Jones Corporation, Los Altos, Calif., a corporation of California
Filed Oct. 11, 1965, Ser. No. 494,569
4 Claims. (Cl. 280—423)

ABSTRACT OF THE DISCLOSURE

A trailer coupler having crossed and pivoted anchor bars each coupled to a separate part of a two-part hitch column that receives a trailer draw-bar.

---

This invention relates to a trailer coupler and, more particularly, to a coupler for joining a trailer draw-bar to the bed frame of a tractor vehicle.

It is desirable in towing semi-trailers, house trailers, and the like, by what are commonly called "pick-up trucks" to couple the draw-bar of the trailer to the tractor vehicle substantially over the axis of the drive wheels. This places the draw-bar load of the front end of the trailer on the springs and the load-supporting rear axle and wheels of the tractor vehicle. This is preferable to the common practice of hitching the trailer to the rear of the tractor vehicle at the bumper or to similar structure.

It is an important object of this invention to provide a trailer coupler which includes an upstanding hitch column adapted to couple with a trailer draw-bar to locate the point of attachment substantially above the surface of the tractor vehicle to which it is attached.

Another object of the invention to provide a hitch column for a trailer coupler which is vertically adjustable as to height of the draw-bar receiving means relative the surface of the tractor vehicle on which it is mounted.

Still a further object of the invention resides in providing a hitch column for trailer couplers having a foot means that may be variably disposed radially of the axis of the column to accommodate various locations of frame members of the tractor vehicle.

These and other objects of the invention will be more apparent during the course of the following specification when read in connection with the accompanying drawings wherein is shown a preferred form of the invention.

In the drawings:

FIGURE 1 is a perspective view of the coupler for joining a trailer draw-bar to the bed frame of a tractor vehicle;

FIGURE 2 is a perspective view of a first anchor bar and its associated collar;

FIGURE 3 is an exploded perspective view of a second anchor bar and its associated hitch column; and FIGURE 4 is a plan view of the coupler and showing various radial dispositions of the first and second anchor bars.

Referring to FIGURE 1, the trailer coupler is shown to comprise an upstanding cylindrical hitch column 10 which is provided with coupling means 12 at its upper end to receive and be coupled with a draw-bar 14 of a trailer vehicle. Means 12 may be a conventional trailer hitch ball firmly attached to column 10. Draw-bar 14 likewise has a mating element of conventional nature to engage and be secured about the ball to provide the desired swiveling action. Of course, alternate coupling means than those specifically described may be employed.

As shown in FIGURE 3 column 10 is cylindrical and near its lower end includes a pair of diametrically opposed transverse slots 16, and at right angles thereto, opposed holes 18, 18.

Collar 20 has legs 22 depending therefrom and attached to an elongated first anchor bar 24 preferably by conventional welding practices. Gussets 26 reinforce the attachment of collar 20 and its legs 22 to bar 24. Each of the legs 22 has a vertical slot 28, 28. Bar 24, between legs 22, 22 has a central bolt hole 30. It will be noted from FIGURE 2 that beneath the collar and between the sides of the legs 22 there is a transverse opening approximately as wide as the collar 20 and of substantial height as governed by the length of legs 22.

Turning now to FIGURE 3 a second elongated anchor bar 32, provided with central bolt hole 34, has upstanding ears 36 each provided with a vertical slot 38. The upstanding ears 36 are spaced apart substantially the diameter of column 10 and their inner faces are curved to closely receive and be engaged by the exterior of column 10. Ears 36 are buttressed by gussets 40, the assembly being preferably securely welded together.

The apparatus of FIGURES 2 and 3 is assembled in the following manner: the second anchor bar 32 is introduced between the legs 22 of bar 24 so that bar 32 overlies bar 34. A bolt (not shown) passes through holes 30 and 34 when they are appropriately aligned. Column 10 is then introduced into collar 20 from above and secured between ears 36 by bolts 42 passed through slots 38 and 16, the bolts being secured in place by conventional nuts within column 10. Bar 32 is narrower than the space between legs 22, 22.

Bolts 44, 44 introduced through slots 28 and the mating bolt holes 18, are also secured by conventional nuts within the column 10.

By reason of this described assembly of the column 10, and the collar 20 and bars 24 and 32, the coupler anchor bars may be disposed in various radial positions as suggested in FIGURE 4. The hitch means on column 10 may be disposed in various vertical positions relative the collar 20 or the surface of a truck bed on which a trailer coupler is anchored.

As shown in FIGURE 1, the floor 50 of a truck body receives the coupler. Customarily beneath such floor, are frame members 52 usually extending fore and aft. As between trucks of different manufacture, the spacing and dimensions of such frame members 52, 52 may vary. Such variable spacing are accommodated by altering the angular relationship of the anchor bars 24 and 32 to superpose either bar holes 54 or bar slots 56 appropriately above the flanges of frame member 22. The anchor bars 24 and 32 are securely bolted to the bed 50 of the truck or other tractor vehicle.

It will be undertsood that changes and alterations may be made in the proportions of the elements included in this coupler and in the shape and arrangement of parts. All such as fall within the spirit and scope of this invention as defined by the subjoined claims is intended to be covered by patent.

Having thus described the invention, what is claimed is:

1. A coupler for joining a trailer draw-bar to the bed frame of tractor vehicle, comprising:
   an upstanding cylindrical hitch column provided with means to couple with a trailer draw-bar;
   a collar about said hitch column and secured thereto by means permitting relative vertical adjustment;
   an elognated first anchor bar secured to said collar and disposed to cross beneath said collar and hitch column, said first anchor bar being adapaed for securement to the bed frame of a tractor unit;
   an elongated second anchor bar disposed in intersecting relation over said first anchor bar beneath said hitch collar and hitch column and adapted for securement to the bed frame of a tractor unit, and
   means securing said second anchor bar to said hitch column for relative rotational and vertical adjustment.

2. A coupler for joining a trailer draw-bar to the bed frame of a tractor vehicle, comprising:
- a pair of elongated anchor bars arranged in X-fashion crosing each other, said bars being pivotally joined for securement to the bed frame of a tractor unit in various radial dispositions relative to each other;
- a two-part upstanding hitch column superposed over the crossing of said anchor bars and provided with means to couple with a trailer draw-bar; and
- means securing each said hitch column part to a separate one of said anchor bars irrespective of their various radial dispositions.

3. The subject matter of claim 2 in which there is included in the means securing the hitch column parts to said anchor bars, means permitting said means to couple with a trailer draw-bar to be secured in various vertical dispositions relative said anchor bars.

4. A coupler for joining a trailer tongue to the bed frame of truck body having a load-receiving box, comprising:
- an upstanding two-part hitch column provided with upper means to couple with a trailer draw-bar, said column being of such height as to dispose said upper means at a height to receive a trailer tongue swingable above the walls of said load-receiving box; and
- means to secure said hitch column part to a truck bed frame, said means including a crossed pair of anchor bars each coupled to hitch column part, said arms being relatively pivotable to various radial positions.

References Cited

UNITED STATES PATENTS

| | | | |
|---|---|---|---|
| 2,416,921 | 3/1947 | Hingley | 280—402 |
| 2,425,521 | 8/1947 | Ellberg | 280—438 |
| 2,436,499 | 2/1948 | Williams | 280—402 |
| 2,719,731 | 10/1955 | Jacobs | 280—402 |
| 3,164,398 | 1/1965 | Lugash | 280—423 |
| 3,220,750 | 11/1965 | Mead | 280—423 |

LEO FRIAGLIA, *Primary Examiner.*